United States Patent
Keller

(10) Patent No.: US 6,834,257 B2
(45) Date of Patent: Dec. 21, 2004

(54) METHOD FOR PROVIDING DIAGNOSTIC MESSAGES

(75) Inventor: Gerhard Keller, Fuerth (DE)

(73) Assignee: Siemens Aktiengesellschaft, München (DE)

( * ) Notice: Subject to any disclaimer, the term of this patent is extended or adjusted under 35 U.S.C. 154(b) by 30 days.

(21) Appl. No.: 10/236,014

(22) Filed: Sep. 5, 2002

(65) Prior Publication Data

US 2003/0061857 A1 Apr. 3, 2003

(30) Foreign Application Priority Data

Sep. 7, 2001 (DE) ......................................... 101 44 006

(51) Int. Cl.⁷ .............................................. G06F 11/30
(52) U.S. Cl. ........................................ 702/183; 714/57
(58) Field of Search ........................ 702/113–115, 122, 702/182–188; 714/2–4, 10, 15–16, 46, 57; 700/79–80, 83; 340/310.01, 825.2

(56) References Cited

U.S. PATENT DOCUMENTS

| | | | | |
|---|---|---|---|---|
| 4,633,467 A | * | 12/1986 | Abel et al. | 714/45 |
| 6,233,536 B1 | * | 5/2001 | Zale et al. | 702/188 |
| 6,243,838 B1 | * | 6/2001 | Liu et al. | 714/57 |
| 6,275,955 B1 | * | 8/2001 | Klein et al. | 714/38 |
| 6,487,677 B1 | * | 11/2002 | Jantz et al. | 714/2 |
| 6,587,812 B1 | * | 7/2003 | Takayama | 702/182 |
| 6,598,173 B1 | * | 7/2003 | Sheikh et al. | 714/4 |
| 6,654,914 B1 | * | 11/2003 | Kaffine et al. | 714/43 |
| 6,654,915 B1 | * | 11/2003 | Lu et al. | 714/57 |

* cited by examiner

*Primary Examiner*—Marc S. Hoff
*Assistant Examiner*—Mary Catherine Baran
(74) *Attorney, Agent, or Firm*—Henry M. Feiereisen

(57) ABSTRACT

The invention is directed to a method for providing message diagnosis, in particular for error messages, and for error recovery in a system with at least one industrial machine and/or components of the machine. One or more error messages and accompanying circumstances are stored in a message diagnosis unit together with the accompanying error recovery measure(s). If one or more known errors are repeated, the stored error recovery measures are immediately and automatically accessed and the proven error recovery measures are transmitted to the respective machine. This provides a method for message diagnosis which improves error handling.

18 Claims, 3 Drawing Sheets

METHOD FOR PROVIDING DIAGNOSTIC MESSAGES

CROSS-REFERENCES TO RELATED APPLICATIONS

This application claims the priority of German Patent Application, Serial No. 101 44 006.5, filed Sep. 7, 2001, the subject matter of which is incorporated herein by reference.

BACKGROUND OF THE INVENTION

The present invention relates to a method for message diagnosis, in particular for diagnosing error messages, and for error recovery.

The article "Internet Technologies in the Industrial Automation: Present Applications and Future Potential" by Peter Terwiesch, published in the Journal Automatisierungstechnik in January 2001 by the Oldenbourg Verlag, discloses on page 32 to 37 remote access to industrial machines, in particular access to the data of industrial machines. Internet technology paves the way for remote monitoring and remote diagnostics. A system-specific operating console on the user side enables the user to make remote requests. Remote monitoring allows one or several experts access to an industrial machine. Remote monitoring can also include supervisory functionality.

Disadvantageously, the data have to be evaluated by human intervention, such as by a group of experts or by at least one expert. The evaluation includes, for example, information about repair measures. Messages, in particular error messages from the least one industrial machine, are diagnosed, for example, centrally via remote monitoring or locally by the expert. The experts are informed about the messages via a man-machine-interface (MMI). The experts obtain their expertise through familiarity with the machines that generate the messages. This expertise is built up, for example, in that the experts know at least one error message that occurs in an industrial machine already from another identical or similar machine, where they have repaired the error through suitable error recovery measures. The error recovery measures are then known to the experts and are used for error recovery on another identical industrial machine. Insight into error messages and the associated error recovery measures can also be obtained, for example, by observing an industrial machine over a certain period of time. Industrial machines are, for example machine tools, production machines or robots. Error diagnosis can also applied to the machines components. A system for error recovery is deduced from the centralized message diagnosis performed by personnel and/or the industrial machine(s) that generate messages, because the experts participate in the error recovery, for example via remote intervention, or locally, possibly through local personnel.

A method for a centralized and/or local message diagnosis raises many problems, such as forgetfulness of people, illness of the experts, response time of the experts, working hours, continuous access to personnel, varying degrees of expertise by different experts, familiarity with foreign languages and so on.

It is therefore desirable to provide a method for error diagnosis which improves error handling and recovery.

SUMMARY OF THE INVENTION

According to one aspect of the invention, in a method for message diagnosis, in particular for error messages, and for error recovery in a system with at least one industrial machine, in particular a machine tool, a production machine and/or a robot and/or components thereof, one or several error messages and their accompanying circumstances are stored in at least one message diagnosis unit together with the corresponding generated error recovery measure(s), so that when one or several known errors are repeated, the stored measures are immediately and automatically accessed and the proven error recovery measures are supplied to the respective machine.

Industrial machines, such as machine tools, production machines and robots, frequently have mechanisms for generating messages. Messages are to be understood as representing information relating to the switch-on state of the industrial machine or other parameters relating to the industrial machine that describe its state, such as temperature, operating times, pressures or error messages. Error messages are generated, for example, when the industrial machine is in a state that is different from its normal operating state. Error messages can be caused, for example, by a malfunction of components which can result in an interruption of the process flow, excess temperatures, excess pressures, the absence of an operating resource, exceeding an electric current or electric voltage or, for example, also a loss of electrical power. Error messages can also be alarm messages. Alarm messages are messages which indicate, for example, a critical state or a potential for a critical state in the near future, which can limit the operating range of the industrial machine, for example a dwindling supply of raw materials for industrial machines that process raw materials. Alarm messages can also relate to the number of operating hours.

Industrial machines frequently include different components. Many machine tools have, for example, electric drives. The electric motor of an electric drive is powered, for example, via a converter. Both the motor and the converter are components and can be implemented so as to generate component messages. Components can also have additional sub-components which can also generate error messages. An example are converters which have a power section and a control section.

An industrial machine or its components generate messages, such as error messages which are supplied to a message diagnosis unit. The messages are provided either locally at the industrial machine or externally.

With an external message diagnosis unit, systems such as telephone lines, wireless transmission, for example via a mobile telephone, data networks such as LAN or WAN or the Internet can be used for data transmission. Transmission channels already in use with remote diagnosis units can also be employed. The transmission of data or messages can be automated so that a message can be transmitted immediately after it has been generated, which speeds up error recovery. The transmission of data and/or messages can also be automated in such a way that they are transmitted with a time delay if transmission to a central unit has to be authorized first. This is advantageous, for example, if a fee has to be paid for the diagnosis of the messages and for returning messages with proposed error recovery measures, for example to the service provider of the message diagnosis.

With local message diagnosis units, an already existing system for for data processing, such as a numeric controller, a computer-numeric controller or a storage-programmed controller can advantageously be used for the message diagnosis. At least one error recovery measure is stored in the message diagnosis unit in addition to the received error messages. If the message diagnosis unit is not yet aware of error recovery measures for a specific error, then there is either no need for error recovery measures or the proposed error recovery measures should be added to the message diagnosis. When a known error occurs, the message diagnosis unit automatically and immediately accesses the stored error recovery measures which are supplied by the message diagnosis unit to the corresponding machine which reported the error(s). Unknown errors and/or accompanying circumstances can be advantageously included in the message diagnosis. To improve the diagnosis, the accompanying circumstances of the error message are included in the error diagnosis. Accompanying circumstances are, for example, other errors or messages which are produced simultaneously and/or with a time delay, but also the absence of other errors or messages. If, for example, the blower fails in an air-cooled electric machine, then the error messages "blower failure" and "overtemperature" can be generated, whereby either error message can represent an accompanying circumstance for the other error message.

The error recovery measures stored in the message diagnosis unit for an error message and its accompanying circumstances are, for example, instructions for personnel that has to eliminate the error and/or commands to the industrial machine for performing an automatic repair. An automatic repair can be performed, for example, by loading new software in the industrial machine and/or by initiating automatic test and/or optimization processes.

Since error messages repeat for a particular industrial machine or components, or also for different industrial machines or components, error recovery measures are stored for one or several known error messages and can be transmitted to the respective machine. The error message and the error recovery measure(s) are automatically linked and can therefore be performed quickly and immediately. The error recovery measure(s) can advantageously also provided to operators of the industrial machine which advantageously includes a man-machine-interface.

If an error generates different error messages, for example due to a power failure for front-end subassemblies that generate error signals, then a flurry of errors (error shower) or a flurry of messages (message shower) is generated. Error showers with a specific characteristics can be traced to certain errors which can be repaired by error recovery measures. By analyzing and diagnosing error showers and message showers, an original error that indirectly and/or directly accompanies other errors can be used for the diagnosis of the problem and/or error. Error messages can therefore be diagnosed with the help of direct, i.e., accompanying circumstances occurring nearly at the same time, but also by being aware of accompanying circumstances that occurred at different times. Accompanying circumstances are reported to the message diagnosis unit through messages. The absence of accompanying messages is a special form of an accompanying circumstance. Error messages together with their accompanying circumstances, which can also be signal states of a memory-programmable controller, form an error image. If the error messages have additional information, such as a date and/or a time stamp, then this information can be included in the diagnosis to improve the diagnosis of the error(s). Error recovery measures are stored in the central and/or local message diagnosis, i.e., the message diagnosis unit, wherein at least one error recovery measure can be or is associated with certain errors. Advantageously, experience and knowledge of developers, systems testers, application engineers and/or end users can be used. If an error with the corresponding accompanying circumstances is not yet known to the message diagnosis unit, or if associated error recovery measures are not sufficiently known and/or are not known at all, then new information regarding an error, the corresponding accompanying circumstances and/or new or changed error recovery measures can be introduced into the message diagnosis.

In an advantageous embodiment, the method for message diagnosis includes a system with at least two industrial machines that are at least partially identical, whereby one or several error messages and their accompanying circumstances are stored in a central message diagnosis unit together with the accompanying error recovery measure(s), so that if one or more known errors are repeated, the stored error recovery measures are immediately and automatically accessed and the proven error recovery measures are transmitted to the respective machine.

If industrial machines and/or their components are manufactured in a quantity of the order "One", then there exist at least two identical industrial machines or at least two identical components. Identical industrial machines or components are equipped with the same message units or with similar message units, so that these can be compared with each other if error messages or messages in general are present. Data relating to messages and, in particular, data relating to error messages that are supplied to the center having a central message analysis capability are automatically diagnosed.

A central message diagnosis unit has the advantage that the knowledge, i.e., the data concerning repairs, of systems having at least partially identical parts can be enhanced at a central location.

In another advantageous embodiment of the method for message diagnosis, at least two message diagnosis units are provided. The electric machine transmits the messages, in particular the error messages, to a first message diagnosis unit. This unit determines error recovery measures. If these error recovery measures do not eliminate the error, then the error message with the accompanying circumstances can be transmitted by the industrial machine and/or by the first message diagnosis unit to a second, more central message diagnosis unit. This can occur already during the transmission to the first message diagnosis unit, in particular to enhance the data in the central unit and to increase its efficiency. In this way, the first message diagnosis unit as a more central message diagnosis unit need not be concerned with the analysis of simple error images.

In another advantageous embodiment of the invention, the industrial machine supplies to the message diagnosis unit at least one error message and its accompanying circumstances and at least one error recovery measure.

When an industrial machine has transmitted an error message to the central message diagnosis and/or to a first message diagnosis and has received from the central unit one or several error recovery measures, and if the error(s) cannot be repaired or cannot be adequately repaired, then additional error recovery measures must be performed. The error recovery measure which finally repairs an error, must be communicated from the industrial machine to the central system for message diagnosis. If the same error with the previous insufficient error recovery measures is found on the same machine or on the same type of machine or on components of the same type, then a new error recovery measure or measures are stored in the center, i.e. in the central diagnostic unit. Error messages can be evaluated in the context of the accompanying circumstances. The accompanying circumstances can be characterized by the order of the received messages and also by the time stamp of the messages provided by industrial machine or its components. The accompanying circumstances are not only additional error messages and/or alarms, but also operating states. These accompanying circumstances are also stored in the central message diagnosis. The message to the central message diagnosis can also be provided in those cases where the central message diagnosis is associated only with an error, but not yet with an error recovery measure.

According to yet another advantageous embodiment of the invention, error messages of industrial machines and/or of their components can be evaluated statistically.

Error messages of the industrial machines or components are reported to the center having the message diagnosis. The number of error messages and the temporal receipt of error messages can be stored in the center. Statistical data is computed from this information which allows conclusions about the error frequency. Also possible are conclusions about errors under specific accompanying circumstances. The operation of the electrical machine or the components can be improved through additional analysis of the error messages, as can be the spare parts inventory. Results of the statistical data can be used to improve the product or to develop a new product.

According to still another advantageous embodiment of the method, the industrial machine and/or one or several of its components can be identified.

Industrial machines and their components include electronic circuitry. Electronic components can be constructed to be identified, for example by a product number, an identification number, a search number or another numeric or alphanumeric system. Identification makes it possible to uniquely associate error messages with industrial machines and/or components. When components are uniquely associated, a proposal for procuring spare parts can be made in the context of error recovery measures. The center can facilitate or initiate spare parts procurement. For example, a central spare parts inventory control system can determine where a spare part is available. Another advantage is the timely identification for procuring a spare part. Accordingly, the center with message diagnosis can also facilitate and/or organize spare parts procurement. By determining the identity of defective components or defective industrial machines and the time when an error occurred, statistical data can be gathered individually for different industrial machines or components about the error frequency. From the error frequency, conclusions can be drawn with respect to components and their application environment. For example, different errors occur in coastal areas where the air has a high salt content than in areas with less salty air. Knowing the local environment is frequently advantageous for analyzing the errors. The installation sites can be communicated to the center together with the identification numbers by the operator or the manufacturer of the machine. The location can also be determined with systems such as GPS, or in Internet applications by localizing the server and in telecommunication installations by localizing the exchanges. In cellular mobile telephone networks, a coarse localization of at least the transmitting unit relative to the center is possible via the base stations. Because a communication link has to be established between the industrial machine or component to the center, these links can also be used to aid in the determination of the location.

In another advantageous embodiment of the invention, the message diagnosis unit can be used for procuring spare parts.

The message diagnosis unit has information about past errors and the error recovery measures for repairing these errors. If an error recovery measure requires replacing a component by a spare part, then a central message diagnosis unit is provided with information about spare part inventory and/or spare part procurement. Proposals for procuring a spare part can be transmitted from the center to the local industrial machine or the components. These proposals include, for example, information about spare parts suppliers, spare parts inventories, delivery times, travel conditions or contract terms.

For one of the aforedescribed embodiments of the method for message diagnosis, there is also provided a message diagnosis unit for carrying out at least part of the method. The central message diagnosis unit is adapted to receive one or several error messages and their accompanying circumstances from an industrial machine. The error messages can be diagnosed, wherein if the error image is known, at least one error recovery measure stored in the message diagnosis unit can be transmitted immediately.

The central message analysis unit, i.e., the message diagnosis unit, analyzes messages error messages and also alarm messages which can be viewed as error messages. Error messages together with the accompanying circumstances produce error images. An error image includes at least one error message. The error images are compared with stored error images. If an identical or similar error image is found, then the error recovery measures associated with a determined error image are transmitted to the device reporting the error, which is in particular the industrial machine.

In an advantageous embodiment, the message diagnosis unit is a central unit that is associated with at least two industrial machines that are at least partially identical. The capacity of the message diagnosis in the message diagnosis unit can thereby be better utilized and expert knowledge present in the message diagnosis unit can be updated more quickly.

According to another advantageous embodiment, the message diagnosis unit is connected with at least one additional message diagnosis unit. The connection is a data connection, for example, via the Internet. In this way, data can be exchanged between different message diagnosis units.

According to yet another advantageous embodiment of the message diagnosis unit, for at least one occurrence of an error, at least one error message as well as the accompanying circumstances and at least one error recovery measure can be transmitted from the industrial machine to the message diagnosis unit.

If an error image is unknown to the message diagnosis unit or if only similar error messages are known and if corresponding error recovery measures do not eliminate the error, then other measures have to be taken by the person(s) responsible for the repair. The measures that eliminate the error can be and will be communicated at least to the central message diagnosis unit. The communication includes the error message or the error image with the accompanying circumstances and the corresponding successfully performed error recovery measure(s). The information can be transmitted via different channels. For example, the information can be communicated by the industrial machine or the component which is in communication with the message diagnosis unit. The information can also be communicated via fax, a letter or a telephone call or other similar means. Information concerning an error with the corresponding accompanying circumstances can be communicated automatically to the central message analysis unit by the industrial machine. Because a message diagnosis unit is attended by at least one person, information about an error and the error recovery measures can also be updated via a man-machine-interface (MMI).

According to an advantageous embodiment of the message diagnosis unit, the industrial machine and/or one or several of its components can be identified.

Because industrial machines, such as machine tools, production machines or robots or their components, as well as motors or converters carry identification numbers, errors can be associated with an identifiable component. This association allows the production of statistical data relating to the error frequency of certain components. In addition, the error frequency within certain batches can be evaluated. By identifying the respective component, spare parts procurement can be simplified, since defective components can be identified and spare parts can be ordered for an exchange of the defective part. The identification feature is particularly advantageous with a centralized message diagnosis unit.

In an advantageous embodiment of the message diagnosis unit, the Internet can represent a medium for exchanging data between the industrial machine and a central message diagnosis unit.

The Internet or data transport systems arranged like the Internet have become commonplace. By assigning identification numbers to the devices in the Internet, the respective device can be identified and possibly also associated with a location. The Internet enables a continuous as well as a temporary connection with the central message diagnosis unit. The temporary connection can be established in particular when an error or a message occurs which requires connection with the central message diagnosis unit. Temporary connections can be established, for example, as a point-to-point connection via a telephone line.

Further features and advantages of the present invention will be apparent from the following description of preferred embodiments and from the claims.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
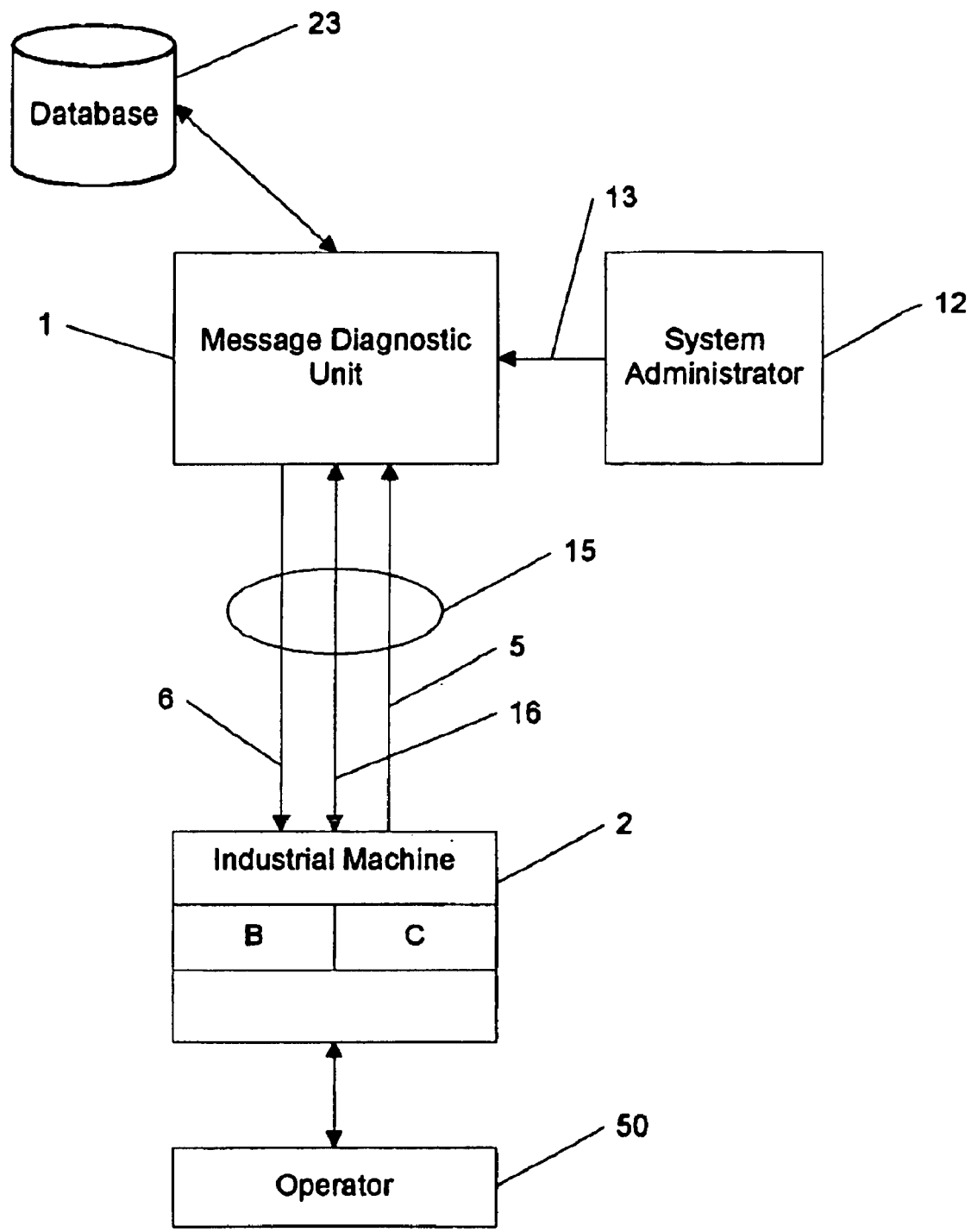
FIG. 1 shows an exemplary diagram for message diagnosis.

The method and system described herein are directed to message diagnosis, in particular for diagnosing error messages, and for error recovery. The diagram of FIG. 1 shows a central message diagnosis unit 1 with a data storage device 23 which can store error messages, error recovery measures and other information pertinent for message diagnosis as described below. The message diagnosis unit 1 can be operated by a system operator 12 via a man-machine-interface (MMI) 13. An exemplary industrial machine 2 is connected with the message diagnosis unit 1 at least for data transmission. Advantageously, the message diagnosis unit 1 can be part of the industrial machine 2 and can run on a memory-programmable controller, a numeric controller (NC) and/or a computer-controlled numeric controller (CNC). The industrial machine 2 is shown as including two components B and C. An operator 50 can recall data from the industrial machine and/or transmit data to the machine, such parameters or commands, via a man-machine-interface 13.

For example, if an error is detected in the industrial machine 2, then this error is reported to the message diagnosis unit 1 in form of a message list. The message list includes at least one message, in particular an error message, whereby accompanying circumstances can also be indicated. The message diagnosis unit 1 diagnoses the message list 5 and compares the message list 5 with stored message lists. If the message list 5 is identical or similar to an already stored message list, error recovery measures or an error recovery measure list 6 are proposed. The error recovery measure list 6 is transmitted from the message diagnosis unit 1 to the industrial machine 2, using a data transmission link 15. If an error recovery measure for a specific error is not yet present in the message diagnosis unit, then this error has to be repaired initially in other ways. New error recovery measures can be entered into the message diagnosis unit, so that an initially unknown error recovery measure is thereafter known when the error occurs a second time and can be transmitted automatically to the industrial machine 2. An additional data exchange 16 is advantageously enabled between the industrial machine 2 and the message diagnosis unit 1.

The industrial machine 2 can be operated by an operator 50, whereby the operator is relieved by the message diagnosis unit, because he no longer has to deal with error repairs by himself without the help of the message diagnosis unit. Operators 50 are, for example, personnel of the operating company of the industrial machine or service personnel of the manufacturer. The message diagnosis unit 1 can analyze error messages much more quickly and substantially independent of the personal experiences of operators or other personnel. The operator 50 also does have to be as highly qualified since the know-how for diagnosing messages and errors and repairs is provided by the message diagnosis unit 1. This improves in particular the analysis of message showers and the definition of error recovery measures. Advantageously, the message diagnosis unit 1 can always improve the quality from one received error message to the next. In this way, many users can take advantage of the experiences and error recovery measures of others. The automatic message diagnosis can also relieve an existing hotline, because a repair can be performed more quickly and more accurately by not specially trained operating personnel.

Figure 2:
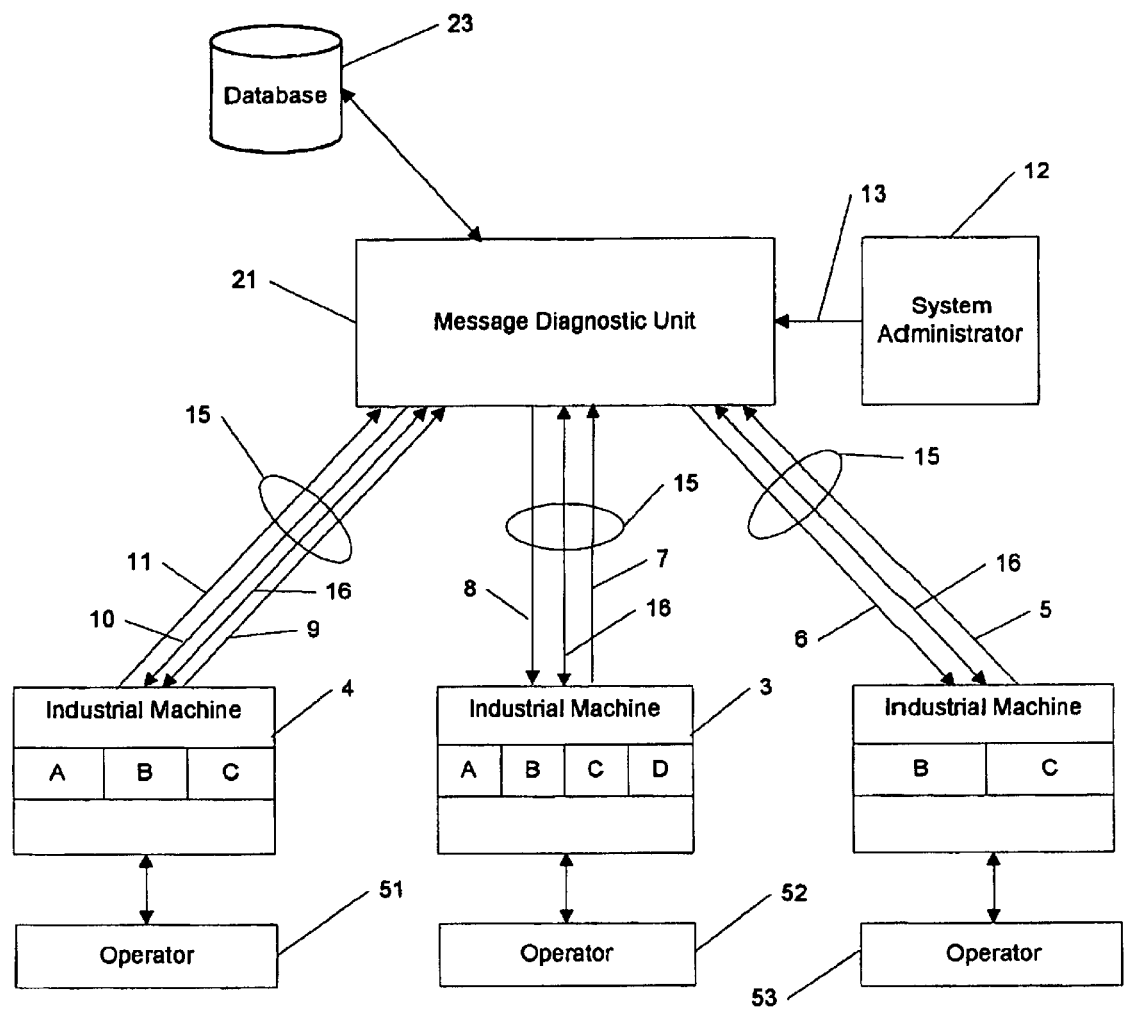
FIG. 2 shows an exemplary diagram of a central message diagnosis unit.

The diagram of FIG. 2 shows a central message diagnosis unit 21 with three industrial machines 2, 3 and 4 arranged upstream of the unit 21. The message diagnosis unit 21 also includes a data storage device 23 which can store error messages, error recovery measures and other information pertinent for message diagnosis as described below. Unlike the message diagnosis unit 1 of FIG. 1 which included only a single industrial machine 2, the message diagnosis unit 21 includes several industrial machines 2, 3 and 4. These industrial machines 2, 3 and 4 are connected via a data transmission link 15 with the central message diagnosis unit 21. The data transmission link 15 can establish a data transmission either permanently or only temporarily. The industrial machine 2 includes two components B and C, whereas the industrial machine 3 includes four components A, B, C and D. The industrial machine 4 includes three components A, B and C. Since the components A, B, C and D of the industrial machines 2, 3 and 4 are of identical type, the components in the different industrial machines can have the same types of errors. An operator 51, 52 and 53 can use the man-machine-interface 13, also referred to as MMI, to recall data from and/or transmit data to the industrial machine 2, 3 and 4, such as parameters or commands.

If for example the industrial machine 2 has an error, then the same process as discussed above with reference to FIG. 1 is executed. If an error occurs in the industrial machine 3 with the components A, B, C and D, which agrees with the error indicated previously by the industrial machine 2, then the message list 7 is again transmitted to the message diagnosis unit 21. The unit 21 evaluates the message list 7 and reports the error recovery measures list 8 to industrial machine 3. An additional data exchange 16 is enabled between the industrial machines 2, 3 and 4 and the message diagnosis unit 21. The errors indicated by the industrial machine 2 or the industrial machine 3 relate, for example, to a component of the industrial machine 2 with which an error can be associated. Because the industrial machines 2 and 3 have partially different components, different error messages are possible. The error messages relating to the identical components A, B, C and D of the two industrial machines 2 and 3 are identical or least similar. Although the components B and C within the industrial machine 3 and the industrial machine 2 are identical, different error recovery measures are possible. The reason is that the same components B, C in the different machines 2, 3 can perform different tasks and/or the same components B, C can be installed in different ways and therefore also need to be replaced differently. A third industrial machine 4 includes three components A, B and C. The industrial machine 4 sends its message list 9 with the errors contained therein to the message diagnosis unit 21. After consolidating the message list 9 with a stored message list, the diagnostic unit 21 sends an error recovery measures list 10 to the industrial machine 4. An operator 51 can read the error recovery measures list 10 and make a repair. Advantageously, the message diagnosis unit 21 transmits commands to the industrial machine 4 which the machine executes so that the error is repaired automatically.

If the message list 9 is not identical or at least similar to any of the stored message lists or error images of the message diagnosis unit 21, then the message diagnosis unit 21 indicates to the machine 4 that no error recovery measure list 10 can be proposed. Measures which lead to a successful repair of the error, are then reported to the message diagnosis unit 1 together with the message list 9 as an error recovery measures list 11. Sending new error recovery measures to the central message diagnosis unit 21 enhances the quantity and quality of the data, in particular of relevant and useful data. If the newly determined error recovery measures cannot be transmitted directly to the message diagnosis unit 21, then the error recovery measures list 11 can also be transmitted to the system administrator 12 who can enter the list 11 together with the corresponding message list 9 into the message diagnosis unit 21. This embodiment, however, is not illustrated in FIG. 2.

Figure 3:
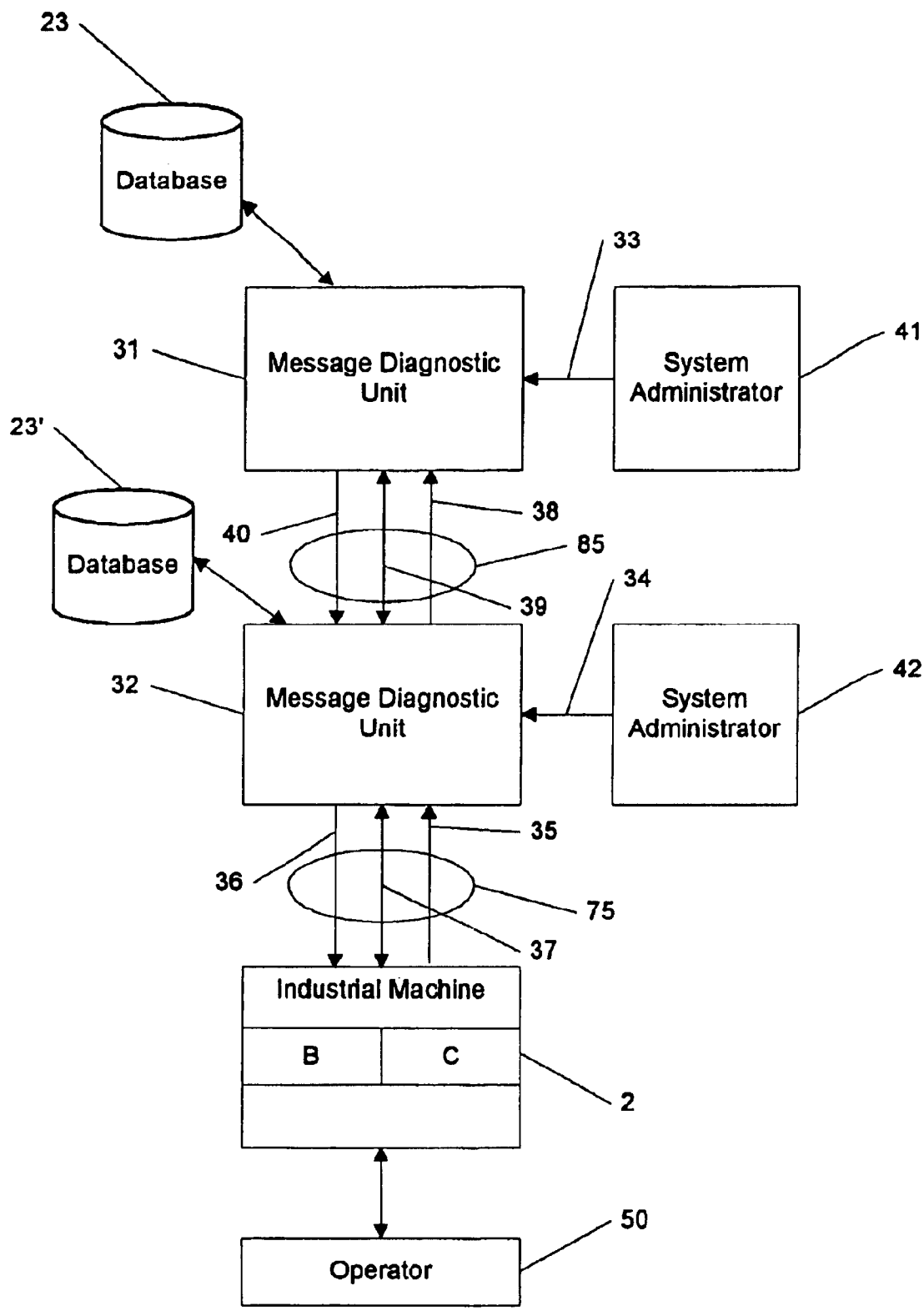
FIG. 3 shows an exemplary system with two message diagnosis units.

The diagram of FIG. 3 depicts another example of the message diagnosis according to the invention. Two message diagnosis units 31 and 32 are depicted together with corresponding data storage device 23, 23' and system administrators 41 and 42 as well as associated man-machine-interfaces 33, 34. The system administrator 42 associated with a second message diagnosis unit 32 is optional, since not all message diagnosis units 31, 32 require a system administrator. The industrial machine 2 is connected for data transmission via a data transmission link 75 with the message diagnosis unit 32, which is in turn connected with a master message diagnosis unit 31 via a data transmission link 85. The data are exchanged in the same manner as described before with reference to FIGS. 1 and 2, namely via message lists 35 and 38, error recovery measures lists 36 and 40, and via another data exchange 37, 39. The unit 31 operates as a master unit, which can be connected, for example, with at least one other message diagnosis unit. This arrangement advantageously produces message diagnosis units 31, 32 which provide a better diagnosis to more centralized units.

While the invention has been illustrated and described in connection with preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A method for providing message diagnosis, in particular for error messages, and for error recovery in a system with at least one industrial machine, comprising the steps of:
   storing at least one error message in at least one message diagnosis unit, storing at least one error recovery measure for the at least one stored error message,
   receiving from the at least one industrial machine an error message, determining based on the at least one stored error message if the received error message is a repeated error message,
   if the received error message is a repeated error message, automatically accessing the at least one stored error recovery measure for the repeated error message,
   if the received error message is not a repeated error message, having a system operator select an error recovery measure from the at least one stored error recovery message, and
   transmitting the accessed or selected at least one stored error recovery measure to the at least one machine.

2. The method of claim 1, wherein the system includes at least two industrial machines that are at least partially identical, and wherein one of the at least one message diagnosis unit is a central message diagnosis unit.

3. The method of claim 1, wherein the error messages are stored in at least two message diagnosis units, with one of the at least two message diagnosis units supplying messages of one industrial machine to the at least one additional message diagnosis unit.

4. The method of claim 1, wherein the at least one industrial machine supplies to the at least one message diagnosis unit at least one error message and an accompanying circumstance and at least one error recovery measure.

5. The method of claim 1, wherein at least one of the stored error messages and the received error message are evaluated statistically.

6. The method of claim 1, wherein the at least one industrial machine is identified.

7. The method of claim 1, wherein the message diagnosis unit procures spare parts for the at least one industrial machine.

8. The method of claim 1, further receiving accompanying circumstances with the at least one error message.

9. The method of claim 1, wherein the industrial machine further includes components and the received and stored error messages also relate to the components of the industrial machine.

10. The method of claim 1, wherein the industrial machine is selected from the group consisting of a machine tool, a production machine and a robot.

11. A message diagnosis unit for message diagnosis and error recovery in a system with at least one industrial machine, comprising:

means for receiving at least one error message from an industrial machine, means for providing an error diagnosis for the industrial machine based on the at least one received error message, means for storing a known error and an associated error recovery measure, and means for transmitting at least one error recovery measure to the at least one industrial machine, wherein if a received error message matches a stored known error, transmitting an associated error recovery measure to the industrial machine, and if the received error message is not a repeated error message, having a system operator select an error recovery measure from the at least one stored error recovery message.

12. The message diagnosis unit of claim 11, wherein the message diagnosis unit is a central unit being associated with at least two industrial machines that are at least partially identical.

13. The message diagnosis unit of claim 11, wherein the message diagnosis unit is connected with at least one additional message diagnosis unit via a data link.

14. The message diagnosis unit of claim 11, further comprising additional means for transmitting, for at least one occurrence of an error, at least one error message as well as accompanying circumstances and at least one error recovery measure from the industrial machine to the message diagnosis.

15. The message diagnosis unit of claim 11, wherein the industrial machine is constructed to be identifiable.

16. The message diagnosis unit of claim 11, wherein the means for transmitting are connected to the Internet.

17. The message diagnosis unit of claim 14, wherein the additional means for transmitting are connected to the Internet.

18. A message diagnosis unit for message diagnosis and error recovery in a system with at least one industrial machine, comprising a database for storing an error message from an industrial machine and at least one error recovery measure associated with the error message:

at least one communication channel connectable to the at least one industrial machine, said communication channel enabled for receiving an actual error message from the at least one industrial machine and transmitting an error recovery measure to the at least one industrial machine, means for comparing the received actual error message with the stored error message, and an interface with a system operator, wherein if the received actual error message matches a stored error message, an error recovery measure associated with the stored error message is transmitted via the communication channel to the at least one industrial machine, and if the received actual error message does not match a stored error message, an error recovery measure associated with the stored error message is proposed by the system operator and transmitted via the communication channel to the at least one industrial machine.

* * * * *